US009166688B2

United States Patent
Shih

(10) Patent No.: US 9,166,688 B2
(45) Date of Patent: Oct. 20, 2015

(54) NETWORK DEVICE OF OPTICAL NETWORK TERMINAL AND METHOD OF ADJUSTING POWER OF OPTICAL SIGNALS

(71) Applicant: ACCTON TECHNOLOGY CORPORATION, Hsinchu (TW)

(72) Inventor: Stone Shih, Taichung (TW)

(73) Assignee: ACCTON TECHNOLOGY CORPORATION, Hsinchu (TW)

(*) Notice: Subject to any disclaimer, the term of this patent is extended or adjusted under 35 U.S.C. 154(b) by 3 days.

(21) Appl. No.: 13/936,287

(22) Filed: Jul. 8, 2013

(65) Prior Publication Data
US 2014/0072300 A1     Mar. 13, 2014

(30) Foreign Application Priority Data

Sep. 11, 2012 (TW) .............................. 101133162 A

(51) Int. Cl.
    *H04J 14/02*     (2006.01)
    *H04B 10/25*     (2013.01)
    *H04B 10/272*     (2013.01)
    *H04Q 11/00*     (2006.01)

(52) U.S. Cl.
    CPC .............. *H04B 10/25* (2013.01); *H04B 10/272* (2013.01); *H04Q 11/0067* (2013.01); *H04Q 2011/0079* (2013.01)

(58) Field of Classification Search
CPC ........... H04B 10/564; H04B 10/07955; H04B 10/272; H04B 10/077; H04B 10/506; H04J 14/0221; H04J 14/0212; H04J 14/0245; H04J 14/0249; H04J 14/02
USPC ...................... 398/66–72, 45, 25, 38, 94, 197
See application file for complete search history.

(56) References Cited

U.S. PATENT DOCUMENTS

| | | | | |
|---|---|---|---|---|
| 5,742,566 | A * | 4/1998 | Imai ........................... | 369/13.54 |
| 7,276,682 | B2 * | 10/2007 | Draper et al. ................ | 250/205 |
| 7,321,606 | B2 * | 1/2008 | Wu et al. ...................... | 372/38.1 |
| 7,433,375 | B2 * | 10/2008 | Wu et al. ................... | 372/29.021 |
| 7,564,881 | B2 * | 7/2009 | Chang ......................... | 372/29.02 |
| 8,086,111 | B2 * | 12/2011 | Miller .......................... | 398/195 |
| 8,208,814 | B2 * | 6/2012 | Sheth et al. ................... | 398/135 |
| 2007/0071031 | A1 * | 3/2007 | Shin et al. ..................... | 370/468 |
| 2007/0286609 | A1 * | 12/2007 | Ikram et al. ................... | 398/197 |
| 2008/0292313 | A1 * | 11/2008 | Mahony et al. ................ | 398/52 |
| 2008/0298807 | A1 * | 12/2008 | Yang et al. .................... | 398/98 |
| 2013/0041518 | A1 * | 2/2013 | Valetutti ...................... | 700/296 |

\* cited by examiner

*Primary Examiner* — Hibret Woldekidan
(74) *Attorney, Agent, or Firm* — Ming Chow; Sinorica, LLC

(57) ABSTRACT

A network device of an optical network terminal (ONT) includes an optical communication interface, an input interface, a memory and a processor. Wherein the optical communication interface transmits optical signals with adjusted transmission power; the input interface is used to input a distance; the memory stores a plurality of distances, and a plurality of databases respectively correspond to the distances; the processor electrically connects to the optical communication interface, input interface and the memory, and is used to access the database in the memory corresponding to the inputted distance, and then adjust the transmission power of the optical communication interface according to the content in the database. In addition, a method of adjusting the power of optical signals is further provided in this invention.

6 Claims, 4 Drawing Sheets

NETWORK DEVICE OF OPTICAL NETWORK TERMINAL AND METHOD OF ADJUSTING POWER OF OPTICAL SIGNALS

The current application claims a foreign priority to the patent application of Taiwan No. 101133162 filed on Sep. 11, 2012.

BACKGROUND OF THE INVENTION

1. Field of the Invention

The present invention relates generally to optical network devices, and more particularly to a network device of an optical network terminal (ONT) and a method of adjusting power of optical signals.

2. Description of the Related Art

For the development of transmission technology through network, optical transmission is replacing the traditional electrical transmission. Gigabits passive optical network (GPON) has been widely applied in network structures to provide high speed transmission and to broaden the bandwidth.

The GPON system includes an optical line terminal (OLT) at the service provider's central office (CO) and a plurality of optical network terminals (ONTs) near end users. OLT transmits downstream and upstream signals between CO and ONTs.

However, the distance between each ONT and the OLT depends, and ONT always transmits optical signals with fixed transmission power. Therefore, for those ONTs set at far, the transmission power may be insufficient, so that the transmission may be incomplete or erroneous. On the contrary, for the transmission between the OLT and those ONTs set near, the transmission power may be too high to cause waste of energy, shorter lifespan of transmission units, and higher cost for maintenance.

The drawbacks described above are unavoidable, as long as the distances between the ONTs and the OLT are different.

SUMMARY OF THE INVENTION

The primary objective of the present invention is to provide a network device of an ONT, which is able to adjust the transmission power of optical signals depending on a distance between the ONT and an OLT.

According to the objective of the present invention, one embodiment of the present invention provides a network device to transmit an optical signal to an OLT. The network device includes an optical communication interface, an input interface, a memory and a processor; wherein the optical communication interface transmits the optical signal to the OLT according to a setting of a transmission power. A distance between the network device and the OLT is inputted via the input interface and the memory stores a plurality of distances and a database corresponding to the distances; the processor electrically connects to the optical communication interface, the input interface, and the memory. According to the distance inputted via the input interface, the processor accesses the corresponding database in the memory to adjust the transmission power of the optical communication interface basing on the content in the database.

Following the above ideas, the present invention further provides a method of adjusting the transmission power of the ONT, which includes the following steps:

A. Input the distance between the ONT and the OLT;

B. Access the database corresponding to the inputted distance, and

C. Adjust the transmission power of optical signals basing on the content in the accessed database.

Herewith the transmission power of optical signals can be adjusted depending on the distance to the OLT.

DETAILED DESCRIPTION OF THE INVENTION

The detailed description and technical contents of the present invention will be explained with reference to the accompanying drawings. However, the drawings are illustrative only but not used to limit the present invention.

Figure 1:
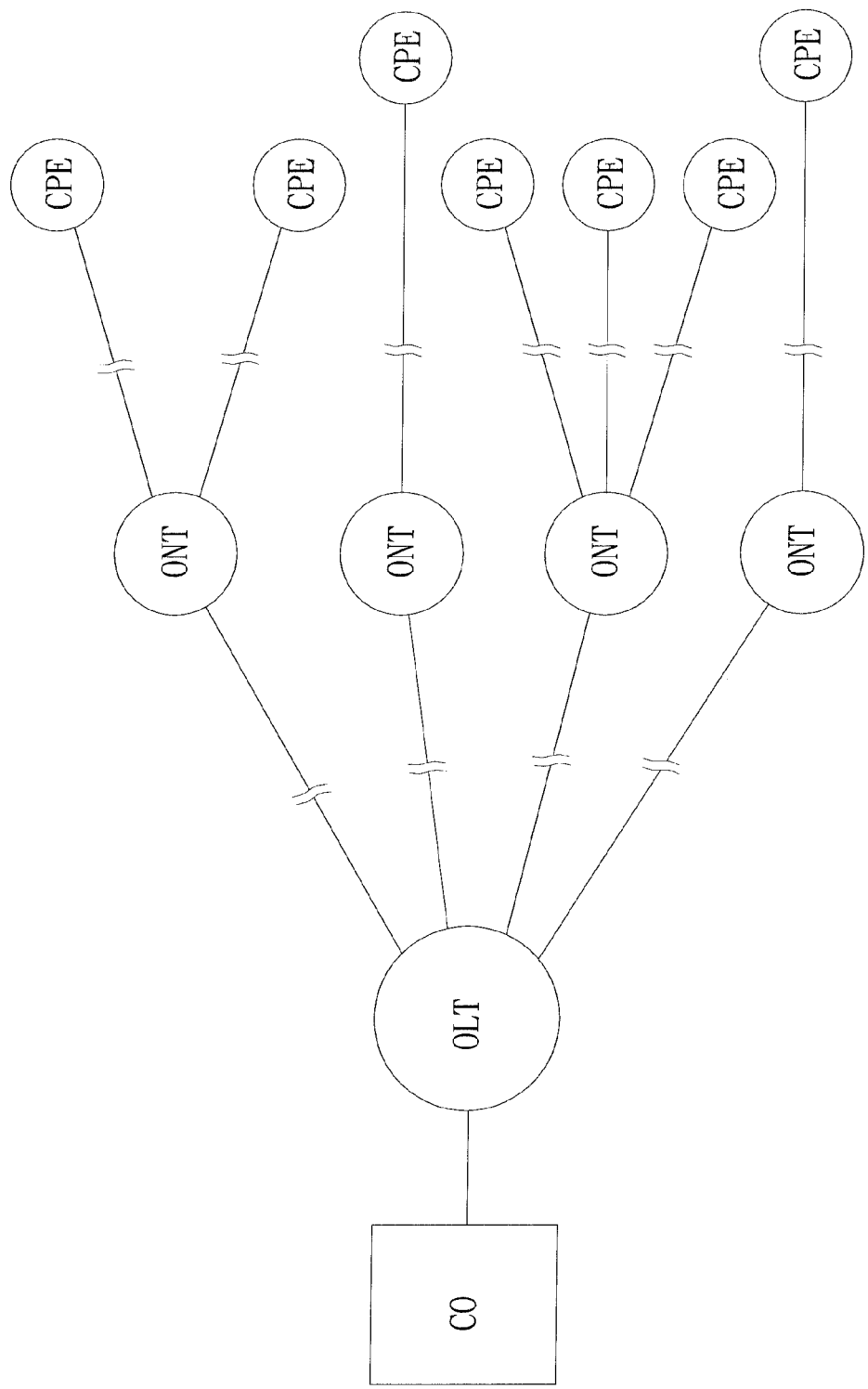
FIG. 1 is a structural view of the optical fiber network system.

FIG. 1 shows an optical fiber network system, which is a gigabit passive optical network (GPON), including an optical line terminal (OLT) and a plurality of optical network terminals (ONTs), wherein the ONT is so-called optical network unit.

The OLT receives an optical signal from a central office (CO), and then transmits it to each ONT.

The ONT receives the optical signal from the OLT, and then convert it into an electrical signal for delivering to customer premise equipment (CPE), or vice versa. In other words, the ONT also converts the electrical signal from CPE into the optical signal, and then delivers it to the OLT. In an embodiment, the ONTs could be switches, routers, residential gateways, or modems, etc.

Figure 2:
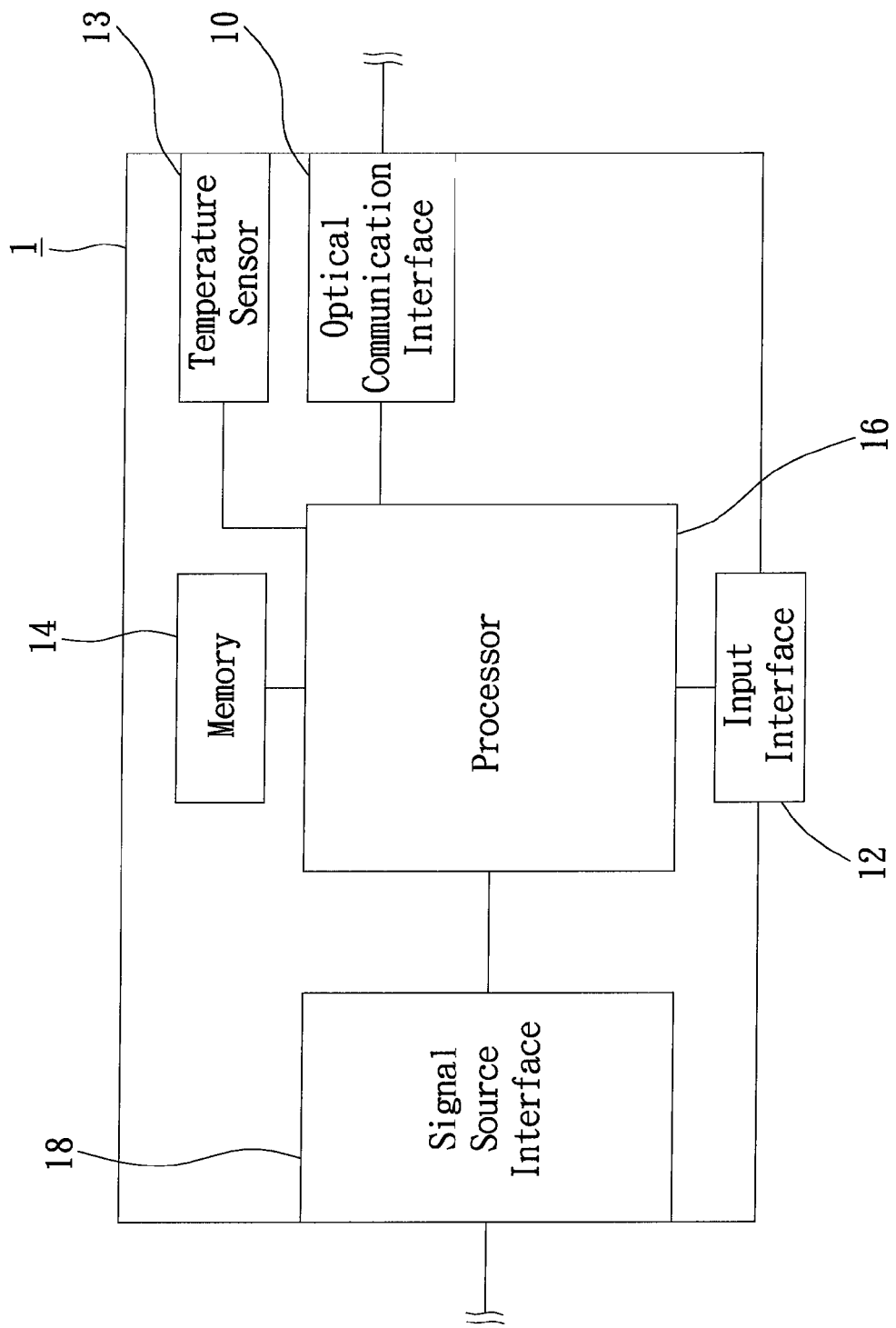
FIG. 2 is the block diagram of a preferred embodiment of the present invention.

As shown in FIG. 2, a network device 1 with the ONT of the preferred embodiment of the present invention includes an optical communication interface 10, an input interface 12, a temperature sensor 13, a memory 14, a processor 16, and at least one signal source interface 18.

The optical communication interface 10 transmits optical signals to the OLT according to a pre-determined transmission power. In the preferred embodiment, the optical communication interface 10 includes an optical transmitter which generates optical signals via a light-emitting circuit. The light-emitting circuit drives a light-emitting diode (LED) for example. To clarify further, the transmission power of the optical signals can be set differently by adjusting a gain of the light-emitting circuit. In other words, the optical communication interface 10 transmits and receives optical signals to and from the OLT, and it also provides a setting function of the transmission power, which can be used to set the transmission power while transmitting optical signals and the optical communication interface 10 transmits optical signals corresponding to the transmission power. In the preferred embodiment, the optical transmission technology is the GPON technique based on ITU-T G984.x standard. Specifically, according to the GPON technique, the optical communication interface 10 transmits optical signals with 1310 nm wavelength to the OLT, and receives optical signals with 1490 nm or 1550 nm wavelength from the OLT. In an embodiment, the optical communication interface 10 could be an optical communication module, an optical communication chipset, or any circuits or systems which are compatible with the GPON technique, but the optical communication interface 10 is not limited to those aforesaid.

The input interface 12 is operated to input a distance between the network device 1 and the OLT. In the preferred embodiment, the input interface 12 is a dual in-line package (dip) switch which includes at least one switch thereon corresponding to two statuses: on and off. The distance can then be represented by the whole status of the dip switch. Specifically, if the dip switch has n switches, then the dip switch has $2^n$ statuses, and each status represents a specified distance. Therefore, the distance can be inputted by setting the on/off status of the switches of the dip switch. To clarify further, the circuit of each switch could generate a first level and a second level of voltage or current, and each level corresponds to either on or off status. Therefore, the on/off status can then be decided by detecting the voltage or current level of each switch. In the preferred embodiment, the first level is a high voltage level, and the second level is a low voltage level. For example, if the distance between the farthest ONT and the OLT is 20 kilometers, and the distance is divided into 4 ranges: 0-2.5 km, 2.5-5 km, 5-10 km and 10-20 km, which can be represented by a dip switch with two switches (on-on, on-off, off-on, off-off). For instance, "on-on" status represents 0-2.5 km, "on-off" status represents 2.5-5 km, and so on. As a result, by sensing the voltage level of each switch, the whole status of the dip switch can be retrieved, and the corresponding distance range can then be decided. Of course, in other embodiments, the input interface 12 could be a touch panel, a button switch, or any interface that allows users to input the distance.

The temperature sensor 13 detects a working temperature of the network device 1.

The memory 14 stores a plurality of distances and a plurality of databases corresponding to the distances. In addition, each database has a plurality of working temperature parameters respectively corresponding to different working temperatures. In the preferred embodiment, the parameter is a gain for the light-emitting circuit of the optical communication interface 10, and by this way, the transmission power can be adjusted by the gain of the light-emitting circuit.

The processor 16 accesses the database which corresponds to the distance inputted via the input interface 12, and then obtains a transmission power from the database accordingly. In the preferred embodiment, the processor 16 determines the distance according to the levels of the dip switch of the input interface 12, and then accesses the corresponding database in the memory 14. After that, the processor 16 gets the specific parameter in the database according to the working temperature detected by the temperature sensor 13. Finally, the processor 16 sets the transmission power of the optical communication interface 10 according to the parameter.

The signal source interface 18 receives the electric signal from the CPE, and transmits it to the processor 16. By this way, the processor 16 controls the optical communication interface 10 to transmit corresponding optical signal after receiving the electric signal. And this is how electric signals being converted into optical signals.

Figure 3:
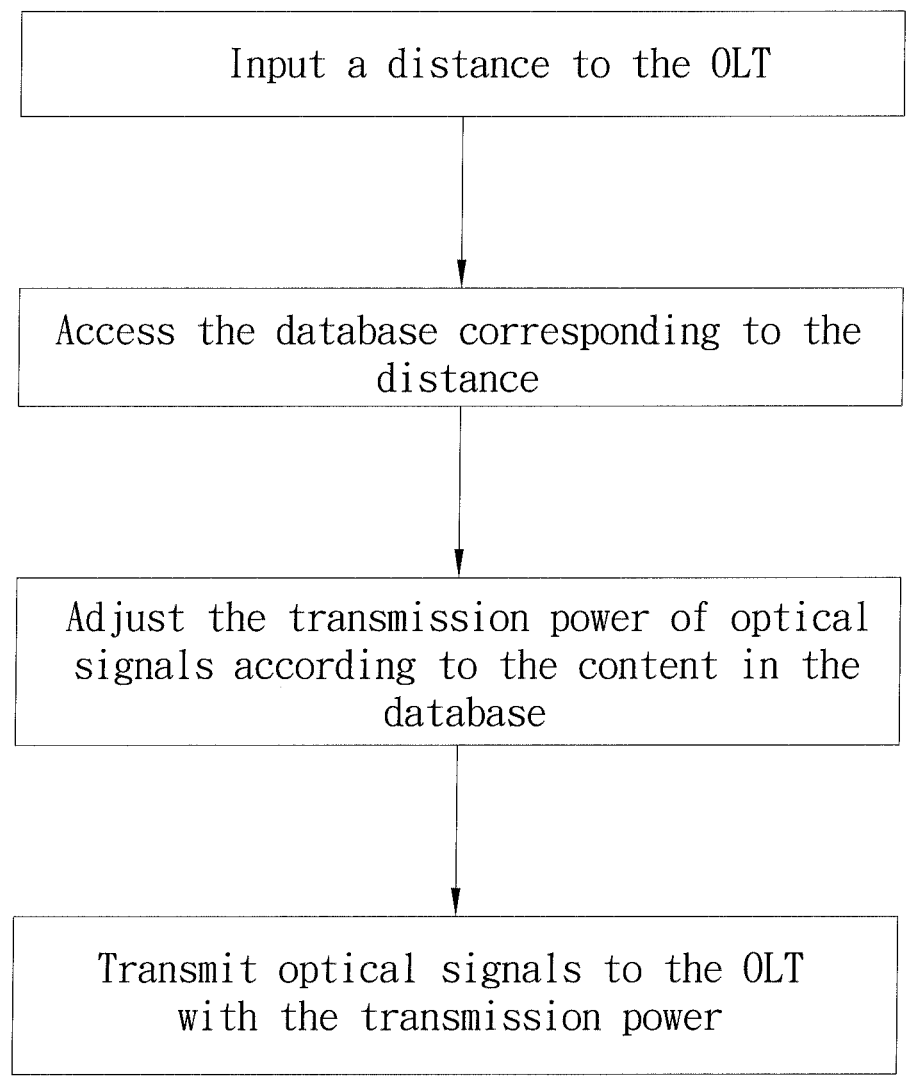
FIG. 3 is the flow chart of the preferred embodiment of the present invention.

As shown in FIG. 2 & FIG. 3, a method of adjusting the power of the optical signals for transmitting the optical signals from the network device 1 to the OLT of the preferred embodiment of the present invention includes the following steps:

A. Input a Distance between the OLT and the Network Device 1:

In this step, the distance between the network device 1 and the OLT is inputted via the input interface 12. In this embodiment, the distance is represented by the whole on-off status of the dip switch.

B. Access the Database Corresponding to the Distance:

In the preferred embodiment, the processor 16 reads the whole on-off status of the dip switch by the voltage levels generated by the each switch in the dip switch, and then determines the distance. According to the distance, the processor 16 accesses the corresponding database in the memory 14.

C. Adjust a Transmission Power of the Optical Signals According to the Content in the Accessed Database:

In the preferred embodiment, the processor 16 accesses the specific database according to the distance, then obtains the working temperature of the network device 1 detected by the temperature sensor 13 after accessing the database. According to the working temperature, the processor 16 obtains the parameter in the database and adjusts the transmission power of the optical communication interface 10 for transmitting optical signals corresponding to the parameter.

For example, if the distance between the network device 1 and the OLT is short (say it is 0~2.5 km), it is unnecessary to transmit optical signals with too high transmission power; furthermore, the parameter which corresponds to short distance reduces the transmission power of the optical communication interface 10. By this way, the optical signals can be transmitted without wasting energy, and the lifespan of the light-emitting unit which generates optical signals can be extended.

On the contrary, if the distance between the network device 1 and the OLT is long (say it is 10-20 km), it needs higher transmission power; furthermore, the parameter which corresponds to long distance arises the transmission power of the optical communication interface 10. As a result, the optical signals can be transmitted completely and precisely.

Through Step A to Step C, the network device 1 is able to adjust its transmission power according to the current distance and working temperature.

After Step C, there is one further step:

D. Convert Received Electric Signal into Corresponding Optical Signal, and Then Transmit the Optical Signal to the OLT According to the Transmission Power Adjusted in Step C In this step, after receiving electric signal from the signal source interface 18, the processor 16 sets the transmission power according to the current distance and working temperature. The optical communication interface 10 then transmits corresponding optical signals with the adjusted transmission power to the OLT.

Figure 4:
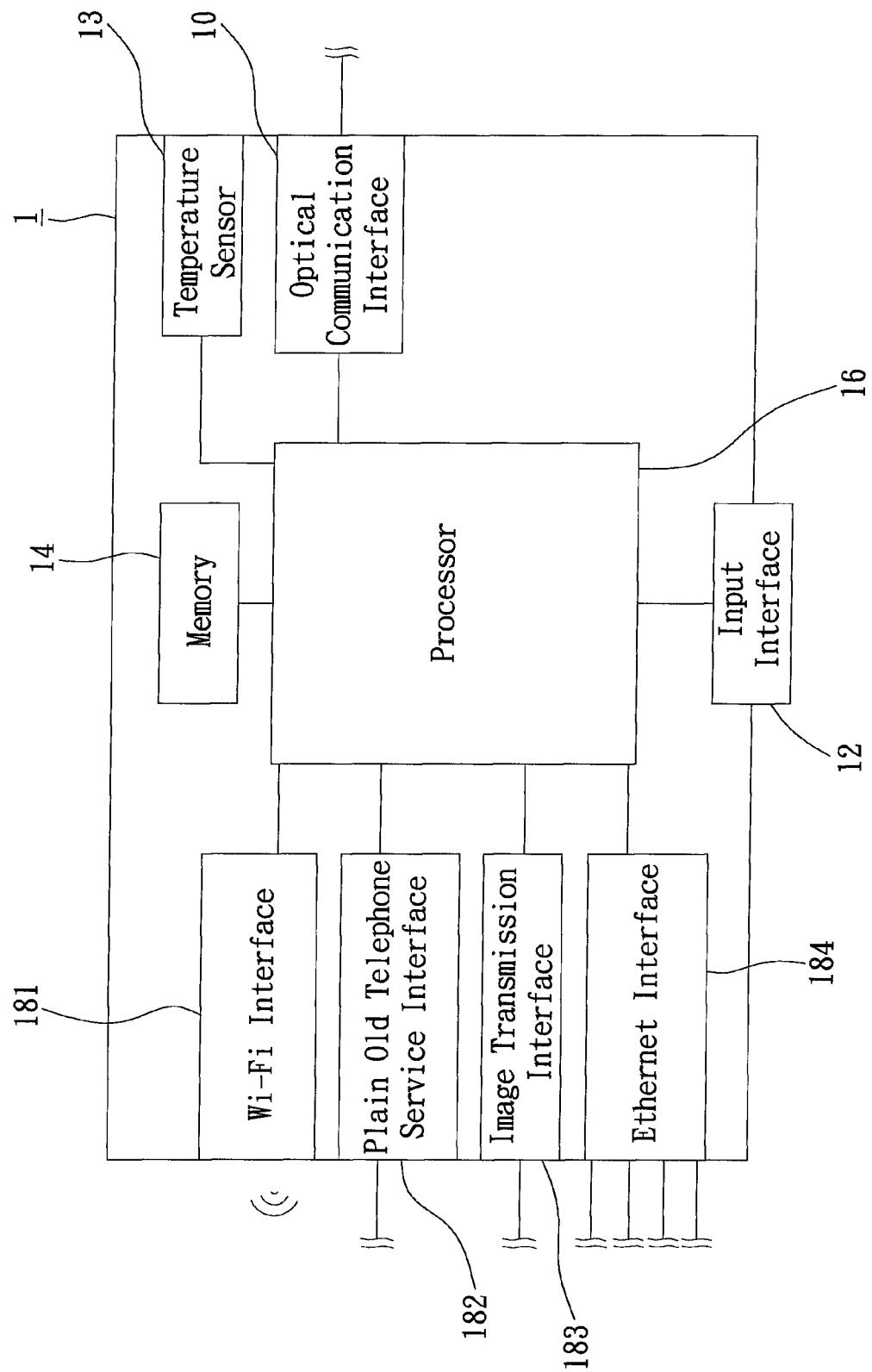
FIG. 4 is the block diagram of another preferred embodiment of the present invention.

In addition, FIG. 4 shows that the signal source interface 18 could involves a Wi-Fi interface 181, a Plain Old Telephone Service (POTS) interface 182, an image transmission interface 183, and an Ethernet interface 184. By this way, the network device is able to send and receive wireless signals, such as Wi-Fi communication signals, POTS signals, image signals, and Ethernet signals, etc., so the network device 1 can provide services including Wi-Fi communication, local network, network telephone, and network TV to connected CPE. Of course, the signal source interface 18 is not limited to the description here, and the components within could be removed or even added, depending on the demand of users.

The description above is a few preferred embodiments of the present invention, and the equivalence of the present invention is still in the scope of claim construction of the present invention.

What is claimed is:

1. A network device of an optical network terminal (ONT), which transmits an optical signal to an optical line terminal (OLT); the network device comprising:

an optical communication interface, which transmits the optical signal according to a transmission power;

an input interface, which is operated for inputting a distance between the ONT and the OLT;

a memory, which stores a plurality of distances and a database corresponding to the distances;

a processor, which electrically connects to the optical communication interface, the input interface and the memory, and accesses the database corresponding to the distance, and then determines the transmission power of the optical communication interface according to the database; and a temperature sensor, which detects a working temperature in surroundings; the each database further comprising a plurality of working temperature, and a plurality of parameters respectively corresponding to the working temperature; wherein the processor obtains the parameter in the database according to the working temperature, and then sets the transmission power of the optical communication interface based on the parameter.

2. The network device as defined in claim 1, wherein the input interface is a dual in-line package (DIP) switch.

3. The network device as defined in claim 2, wherein the dual in-line package switch has at least one switch, and the on/off status of the switch represents the distances.

4. The network device as defined in claim 1, further comprising at least one signal source interface, which electrically connects to the processor and generates an electric signal; after receiving the electric signal, the processor controls the optical communication interface to generate corresponding optical signals.

5. A method of adjusting transmission power of optical signals, which is applied in an optical network terminal (ONT), wherein the ONT has a plurality of databases, and transmits data by generating optical signals to an optical line terminal (OLT); wherein the database stores at least one working temperature, and at least one parameter corresponding to the working temperature; the method comprising the steps of:

A. inputting a distance, wherein the distance represents a distance between the ONT and the OLT;

B. accessing the database corresponding to the distance, and

C. detecting a working temperature by a temperature sensor, obtaining the parameter in the database corresponding to the working temperature, and adjusting the transmission power of optical signals based on the parameter.

6. The method as defined in claim 5, wherein the distance in the Step A is inputted by adjusting the on/off status of a dip switch.

\* \* \* \* \*